April 25, 1950      H. W. KOST      2,504,986
SNAP-IN SPRING FASTENER
Filed March 17, 1948
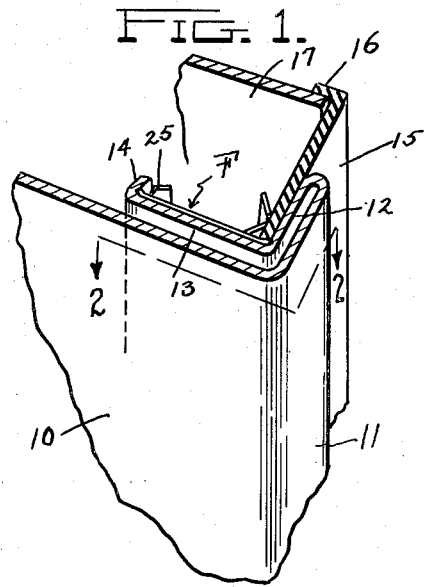
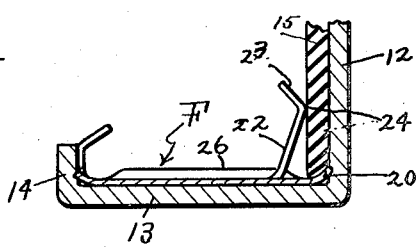
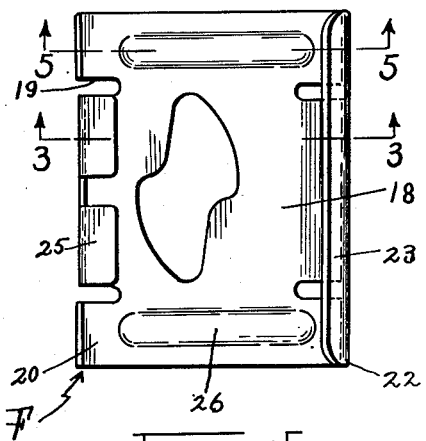
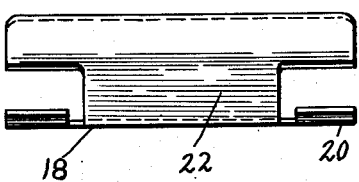
INVENTOR.
Harold W. Kost
BY
*Malcolm W. Fraser*
ATTORNEY Patented Apr. 25, 1950

2,504,986

UNITED STATES PATENT OFFICE 2,504,986

SNAP-IN SPRING FASTENER

Harold W. Kost, Toledo, Ohio, assignor to Prestole Corporation, Toledo, Ohio, a corporation of Michigan Application March 17, 1948, Serial No. 15,381

1 Claim. (Cl. 24—73)

This invention relates to fasteners, but more particularly to a fastener for holding panels or strips in position against a supporting surface, such, for example, as breaker strips on refrigerators.

An object is to produce a simple and efficient fastener of this character from spring metal which can be readily and conveniently mounted in place in a channel member and which is adapted firmly to hold the panel in place against one wall of the channel, thereby eliminating the use of bolt and nut assemblies, screws, clamps and the like which have heretofore been used for the purpose.

Another object is to produce a spring metal fastener which may be formed from stamping and which is provided with fingers to impinge into the side walls of a U member so as securely to hold the fastener in position, the fastener having an integral spring clamping element designed to admit a strip or panel adjacent one wall of the U member and firmly and reliably hold such strip in the desired assembled position.

A further object is to produce a one-piece spring metal fastener provided with integral impinging fingers for retaining the fastener securely in the desired position and which is also provided with a resilient clamping tongue for engaging a panel or strip or the like for frictionally holding it in position.

For purposes of illustration but not of limitation, an embodiment of the invention is shown on the accompanying drawings, in which:

Figure 1 is a perspective elevation partly in section of a supporting element providing a U channel, showing the fastener mounted in position of use in the channel and in clamping engagement with a breaker strip for holding the latter in the desired position;

Figure 2 is a fragmentary enlarged sectional view substantially on the line 2—2 of Figure 1, taken through the channel member;

Figure 2A is a top plan view, on an enlarged scale, of the fastener;

Figure 3 is a transverse sectional view on the line 3—3 of Figure 2A;

Figure 4 is a side elevation of the fastener showing particularly the clamping tongue; and Figure 5 is a transverse section through a pair of fingers substantially on the line 5—5 of Figure 2A.

The illustrated embodiment of the invention comprises a metallic wall portion 10 which is bent at substantially right angles to provide a juxtaposed wall portion 11. The free end of the wall 11 is bent upon itself to provide a relatively deep wall 12, a bottom wall 13, and a relatively narrow wall 14 substantially parallel with the wall 12. The walls 12, 13 and 14 provide a channel substantially U-shaped in cross section, with one wall substantially longer than the other. Against the inner face of the wall 12 abuts a panel or strip 15 which is referred to as a breaker strip, and may be of non-metallic material such, for example, as a suitable plastic. The outer edge of the strip 15 has a flange 16 against the inner face of which abuts a panel 17.

The above described structure is peculiar to certain domestic refrigerator bodies, and heretofore the breaker strip 15 has been connected by screws or similar fasteners, but in view of the concealed position of the inner face of the wall 12, it has been an onorous problem readily to mount this strip. Such difficulty is overcome by the provision of the fastener F which consists of a one-piece stamped spring metal body portion 18 generally rectangular in shape and having pairs of slots 19 adjacent opposite ends thereof, thereby to provide pairs of fingers 20, the pairs being disposed at opposite ends of the body 18. The free ends of the fingers 20 incline upwardly and outwardly as indicated at 21. It will be understood that the width of the fastener F is slightly in excess of the width of the channel formed by the walls 12, 13 and 14 so that upon pressing the fastener so that the body abuts flatly against the bottom wall 13, the fingers 20 are flexed slightly, and due to the fact that the ends of the fingers are squared, the points thereby provided impinge against the adjacent walls 12 or 14 and militate against the outward or retrograde movement of the fastener with respect to the bottom wall 13. Thus the fastener is securely retained in the desired position.

Formed on one side of the body portion 18, in particular the side adjacent the relatively wide wall 12, is a substantially T-shaped tongue 22, the stem of which is integral with the body 18 intermediate the adjacent pairs of fingers 20. The stem of the T inclines upwardly and outwardly from the body substantially as indicated in Figure 3 and terminates in an upwardly and inwardly extending end portion 23, thus providing a shoulder 24. The upper or cross part of the T projects outwardly beyond the adjacent fingers 20 in overlying relation, the same being co-extensive with the fastener structure. It will be apparent that the structure is such that after the fastener has been applied to the channel as above explained, the breaker strip 15 may be readily pushed into place, the tongue 22 being cammed inwardly and the shoulder 24 applying a clamping pressure against the strip to hold it in place against the inner face of the wall 12. It will be understood that a number of fasteners of this character are arranged in spaced relation along the channel and their cooperative action satisfactorily retains the strip in the desired position.

On the opposite side of the fastener body 18 is an integral tongue 25 which extends upwardly and terminates in an inwardly inclined portion. This, in cooperation with the tongue 22, affords a convenient hand hold to enable the fastener to be applied in position of use.

In order to impart the desired strength and rigidity to the tongues 20, an integral rib or embossure 26 is formed in the fastener, one elongate rib being provided for each pair of tongues as shown.

It is to be understood that numerous changes in details of construction, arrangement and operation may be effected without departing from the spirit of the invention especially as defined in the appended claim.

What I claim is:

A fastener of the character described, comprising a relatively flat spring metal body portion, pairs of slots in opposite end portions of said body portion providing relatively short fingers with upwardly inclined end portions, a T-shaped tongue having a stem part intermediate one pair of fingers inclining upwardly and outwardly from the body portion and a cross part terminating in an inwardly inclined end portion providing an abutting shoulder spaced upwardly from the adjacent fingers, the cross part of the T lying over and opposite the adjacent fingers.

HAROLD W. KOST.

REFERENCES CITED

The following references are of record in the file of this patent:

UNITED STATES PATENTS

| Number | Name | Date |
|---|---|---|
| 1,040,572 | Otterson | Oct. 8, 1912 |
| 2,100,017 | Van Uum | Nov. 23, 1937 |
| 2,166,889 | Churchill | July 18, 1939 |
| 2,184,249 | Churchill | Dec. 19, 1939 |
| 2,451,591 | Tinnerman et al. | Oct. 19, 1948 |
| 2,433,343 | Reilly | Nov. 4, 1948 |